United States Patent
Ollitrault et al.

(10) Patent No.: US 12,106,184 B2
(45) Date of Patent: Oct. 1, 2024

(54) MULTIREFERENCE PROCEDURE TO PARALLELIZE VARIATIONAL QUANTUM COMPUTING AND ACHIEVE HIGH ACCURACY WITH SHORT CIRCUIT DEPTHS

(71) Applicant: International Business Machines Corporation, Armonk, NY (US)

(72) Inventors: Pauline Ollitrault, Zurich (CH); Guglielmo Mazzola, Zurich (CH); Ivano Tavernelli, Wädenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 408 days.

(21) Appl. No.: 17/550,413

(22) Filed: Dec. 14, 2021

(65) Prior Publication Data
US 2023/0186133 A1    Jun. 15, 2023

(51) Int. Cl.
*G06N 10/40* (2022.01)
*G06F 9/38* (2018.01)
*G06N 10/20* (2022.01)

(52) U.S. Cl.
CPC ............ *G06N 10/40* (2022.01); *G06F 9/3885* (2013.01); *G06N 10/20* (2022.01)

(58) Field of Classification Search
CPC ....... G06N 10/40; G06N 10/20; G06F 9/3885
USPC ...... 708/200; 326/1; 977/839, 902, 709, 933
See application file for complete search history.

(56) References Cited

U.S. PATENT DOCUMENTS

| | | | |
|---|---|---|---|
| 10,832,155 B2 | 11/2020 | Lechner et al. | |
| 10,984,152 B2* | 4/2021 | Rubin | ............... G06F 9/455 |
| 2018/0096085 A1 | 4/2018 | Rubin | |
| 2020/0057957 A1 | 2/2020 | Johnson et al. | |
| 2020/0364601 A1 | 11/2020 | Yamazaki et al. | |
| 2020/0394549 A1 | 12/2020 | Dallaire-Demers et al. | |

FOREIGN PATENT DOCUMENTS

WO    2020010147 A1    1/2020

OTHER PUBLICATIONS

Stair et al., A Multireference Quantum Krylov Algorithm for Strongly Correlated Electrons (J. Chem. Theory Comput. 2020, 16, 2236-2245) (Year: 2020).*
Mcardle, S. et al. | "Improving the accuracy of quantum computational chemistry using the transcorrelated method". arXiv:2006.11181v1 [quant-ph] Jun. 19, 2020, 13 pages.

(Continued)

*Primary Examiner* — Arnold M Kinkead
(74) *Attorney, Agent, or Firm* — Amin, Turocy & Watson, LLP

(57) ABSTRACT

Systems, computer-implemented methods, and computer program products to facilitate multireference parallelization of variational quantum computing to achieve high accuracy with short circuit depths. According to an embodiment, a system can comprise a processor that executes computer executable components stored in memory. The computer executable components comprise a trial component that prepares a multireference trial state based on a qubit operator, by applying a unitary circuit operator to a sum of selected initial configurations.

20 Claims, 10 Drawing Sheets

(56) References Cited

OTHER PUBLICATIONS

Motta, M. et al. | "Quantum simulation of electronic structure with a transcorrelated Hamiltonian: improved accuracy with a smaller footprint on the quantum computer". Physical Chemistry Chemical Physics Journal, Issue 42, 2020, https://doi.org/10.1039/D0CP04106H, 12 pages.

Sokolov, I. et al. | "Quantum orbital-optimized unitary coupled cluster methods in the strongly correlated regime: Can quantum algorithms outperform their classical equivalents?". J. Chem. Phys. 152, 124107 (2020); https://doi.org/10.1063/1.5141835, 18 pages.

Lee, J. et al. | "Generalized Unitary Coupled Cluster Wave functions for Quantum Computation". J. Chem. Theory Comput. 2019, 15, 1, 311-324, 14 pages.

Grimsley, H. R. et al. | "An adaptive variational algorithm for exact molecular simulations on a quantum computer". Nat Commun 10, 3007 (2019). https://doi.org/10.1038/s41467-019-10988-2, 9 pages.

Takeshita, T. et al. | "Increasing the Representation Accuracy of Quantum Simulations of Chemistry without Extra Quantum Resources". Phys. Rev. X 10, 011004—Published Jan. 7, 2020, 9 pages.

Rossmannek, M. et al. | "Quantum HF/DFT-Embedding Algorithms for Electronic Structure Calculations: Scaling up to Complex Molecular Systems". arXiv:2009.01872v1 [quant-ph] Sep. 3, 2020, 16 pages.

Ma, H. et al. | "Quantum simulations of materials on near-term quantum computers". npj Comput Mater 6, 85 (2020). https://doi.org/10.1038/s41524-020-00353-z, 8 pages.

Sugisaki, K. et al. | "Quantum Chemistry on Quantum Computers: A Method for Preparation of Multiconfigurational Wave Functions on Quantum Computers without Performing Post-Hartree-Fock Calculations". ACS Cent. Sci. 2019, 5, 167-175. 9 pages.

Stair, H. et al. | "A Multireference Quantum Krylov Algorithm for Strongly Correlated Electrons". J. Chem. Theory Comput. 2020, 16, 4, 2236-2245, 10 pages.

Szalay, P. G. et al. | "Multiconfiguration Self-Consistent Field and Multireference Configuration Interaction Methods and Applications". Chem. Rev. 2012, 112, 1, 108-181, 74 pages.

Hempel, C. et al. | "Quantum chemistry calculations on a trapped-ion quantum simulator". eigenarXiv: 1803.10238v2 [quant-ph] Aug. 1, 2018, 22 pages.

* cited by examiner

MULTIREFERENCE PROCEDURE TO PARALLELIZE VARIATIONAL QUANTUM COMPUTING AND ACHIEVE HIGH ACCURACY WITH SHORT CIRCUIT DEPTHS

BACKGROUND

The subject disclosure relates to variational quantum computing, and more specifically, to multireference parallelization of variational quantum computing to achieve high accuracy with short circuit depths.

A variational quantum eigensolver (VQE) is an algorithm that uses a parameterized circuit of a quantum computer to simulate a ground state of a molecule. A parameterized circuit is a series of quantum gates that can be implemented on a quantum computer, and can be adjusted via parameters, such as the angles of single qubit rotation gates. The use of variational quantum eigensolver-based algorithms has great potential to address a variety of problems related to quantum chemistry, many-body lattice models, lattice gauge theory models, and material sciences. However, the advantage of performing a variational calculation on a quantum computer, rather than on classical hardware, is based on the larger expressibility of quantum circuits in defining a variational state. The larger expressibility is based on the larger Hilbert space of quantum circuits but is also controlled by a polynomially increasing number of variational parameters. In order to outperform classical systems and calculations, the quantum circuits typically use a large number of gates (have deep circuit depth) to produce sufficiently entangled states to enable larger expressibility.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate multireference parallelization of variational quantum computing to achieve high accuracy with short circuit depths.

According to an embodiment, a system can comprise a processor that executes computer executable components stored in memory. The computer executable components comprise a trial state component that prepares a multireference trial state based on a qubit operator, by applying a unitary circuit operator to a sum of selected initial configurations. An advantage of such a system is that by selecting a multireference trial state, as opposed to a single reference trial state, the circuit depth used to effectively perform VQE algorithms is reduced.

In some embodiments, the computer executable components can further comprise an expectation component that computes an expectation value of the qubit operator from the selected initial configurations. An advantage of such a system is that the performance of the VQE algorithm can be determined based on the expectation value.

According to another embodiment, a computer-implemented method can comprise preparing, by a system operatively coupled to a processor, a multireference trial state based on a qubit operator, by applying a unitary circuit operator to a sum of selected initial configurations. An advantage of such a computer-implemented method is that by selecting a multireference trial state, as opposed to a single reference trial state, the circuit depth used to effectively perform VQE algorithms is reduced.

In some embodiments, the above computer-implemented method can further comprise, computing, by the system, an expectation value of the qubit operator from the selected initial configurations. An advantage of such a computer-implemented method is that the performance of the VQE algorithm can be determined based on the expectation value.

According to another embodiment, a computer program product comprising a computer readable storage medium having program instructions embodied therewith, the program instructions executable by a processor to cause the processor to prepare a multireference trial state based on a qubit operator, by applying a unitary circuit operator to a sum of selected initial configurations. An advantage of such a computer program product is that by selecting a multireference trial state, as opposed to a single reference trial state, the circuit depth used to effectively perform VQE algorithms is reduced.

In some embodiments, the program instructions are further executable by the processor to cause the processor to compute an expectation value of the qubit operator from the selected initial configurations. An advantage of such a computer program product is that the performance of the VQE algorithm can be determined based on the expectation value.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Due to hardware restraints, including cost and manufacture issues, current quantum circuits are typically rather shallow (have a relatively lower number of gates). Moreover, the desire to reduce the length of quantum circuits also translates to the fault tolerant setting. As such, continuously parameterized gate rotations translate into a long sequence of logical gates, therefore affecting runtimes of future-error corrected simulations.

Given the problems described above with existing quantum variational eigensolver technologies, the present disclosure can be implemented to produce a solution to these problems in the form of systems, computer-implemented methods, and/or computer program products that can facilitate multireference parallelization of variational quantum computing to achieve high accuracy with short circuit depths by: preparing a multireference trial state based on a qubit operator, by applying a unitary circuit operator to a sum of selected initial configurations. An advantage of such systems, computer-implemented methods, and/or computer program products is that by selecting a multireference trial state, as opposed to a single reference trial state, the circuit depth used to effectively perform VQE algorithms is reduced.

In some embodiments, the present disclosure can be implemented to produce a solution to the problems described above in the form of systems, computer-implemented methods, and/or computer program products that can further facilitate multireference parallelization of variational quantum computing to achieve high accuracy with short circuit depths by: computing an expectation value of the qubit operator from the selected initial configurations. An advantage of such systems, computer-implemented methods, and/or computer program products is that they can be implemented to evaluate the performance of the VQE algorithm based on the expectation value.

Figure 1:
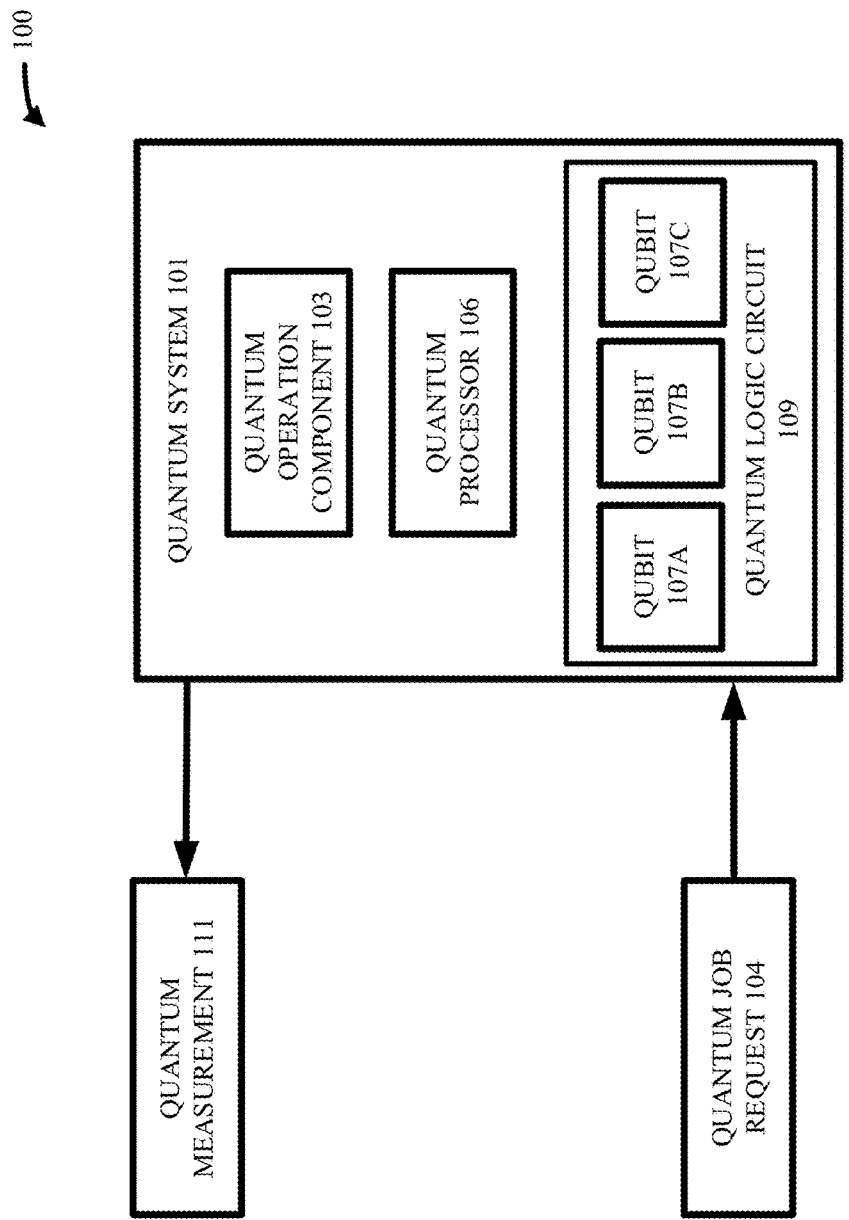
FIG. 1 illustrates a block diagram of an example, non-limiting system that can complete execution of a quantum job in accordance with one or more embodiments described herein.

Turning first generally to FIG. 1, one or more embodiments described herein can include one or more devices, systems and/or apparatuses that can facilitate executing one or more quantum operations to facilitate output of one or more quantum results. For example, FIG. 1 illustrates a block diagram of an example, non-limiting system 100 that can complete the execution of a quantum job.

The quantum system 101 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 111, can be responsive to the quantum job request 104 and associated input data and can be based at least in part on the input data, quantum functions and/or quantum computations.

In one or more embodiments, the quantum system 101 can comprise one or more quantum components, such as a quantum operation component 103, a quantum processor 106 and a quantum logic circuit 109 comprising one or more qubits (e.g., qubits 107A, 107B and/or 107C), also referred to herein as qubit devices 107A, 107B and 107C. The quantum processor 106 can be any suitable processor, such as being capable of controlling qubit coherence and the like. The quantum processor 106 can generate one or more instructions for controlling the one or more processes of the quantum operation component 103.

The quantum operation component 103 that can obtain (e.g., download, receive, search for and/or the like) a quantum job request 104 requesting execution of one or more quantum programs. The quantum operation component 103 can determine one or more quantum logic circuits, such as the quantum logic circuit 109, for executing the quantum program. The request 104 can be provided in any suitable format, such as a text format, binary format and/or another suitable format. In one or more embodiments, the request 104 can be received by a component other than a component of the quantum system 101, such as a by a component of a classical system coupled to and/or in communication with the quantum system 101.

The quantum operation component 103 can perform one or more quantum processes, calculations and/or measurements for operating one or more quantum circuits on the one or more qubits 107A, 107B and/or 107C. For example, the quantum operation component 103 can operate one or more qubit effectors, such as qubit oscillators, harmonic oscillators, pulse generators and/or the like to cause one or more pulses to stimulate and/or manipulate the state(s) of the one or more qubits 107A, 107B and/or 107C comprised by the quantum system 101. That is, the quantum operation component 103, such as in combination with the quantum processor 106, can execute operation of a quantum logic circuit on one or more qubits of the circuit (e.g., qubit 107A, 107B and/or 107C). The quantum operation component 103 can output one or more quantum job results, such as one or more quantum measurements 111, in response to the quantum job request 104.

It will be appreciated that the following description(s) refer(s) to the operation of a single quantum program from a single quantum job request. However, it also will be appreciated that one or more of the processes described herein can be scalable, such as execution of one or more quantum programs and/or quantum job requests in parallel with one another.

In one or more embodiments, the non-limiting system 100 can be a hybrid system and thus can include both one or more classical systems, such as a quantum program implementation system, and one or more quantum systems, such as the quantum system 101. In one or more other embodiments, the quantum system 101 can be separate from, but function in combination with, a classical system.

In such case, one or more communications between one or more components of the non-limiting system 100 and a classical system can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Figure 2:
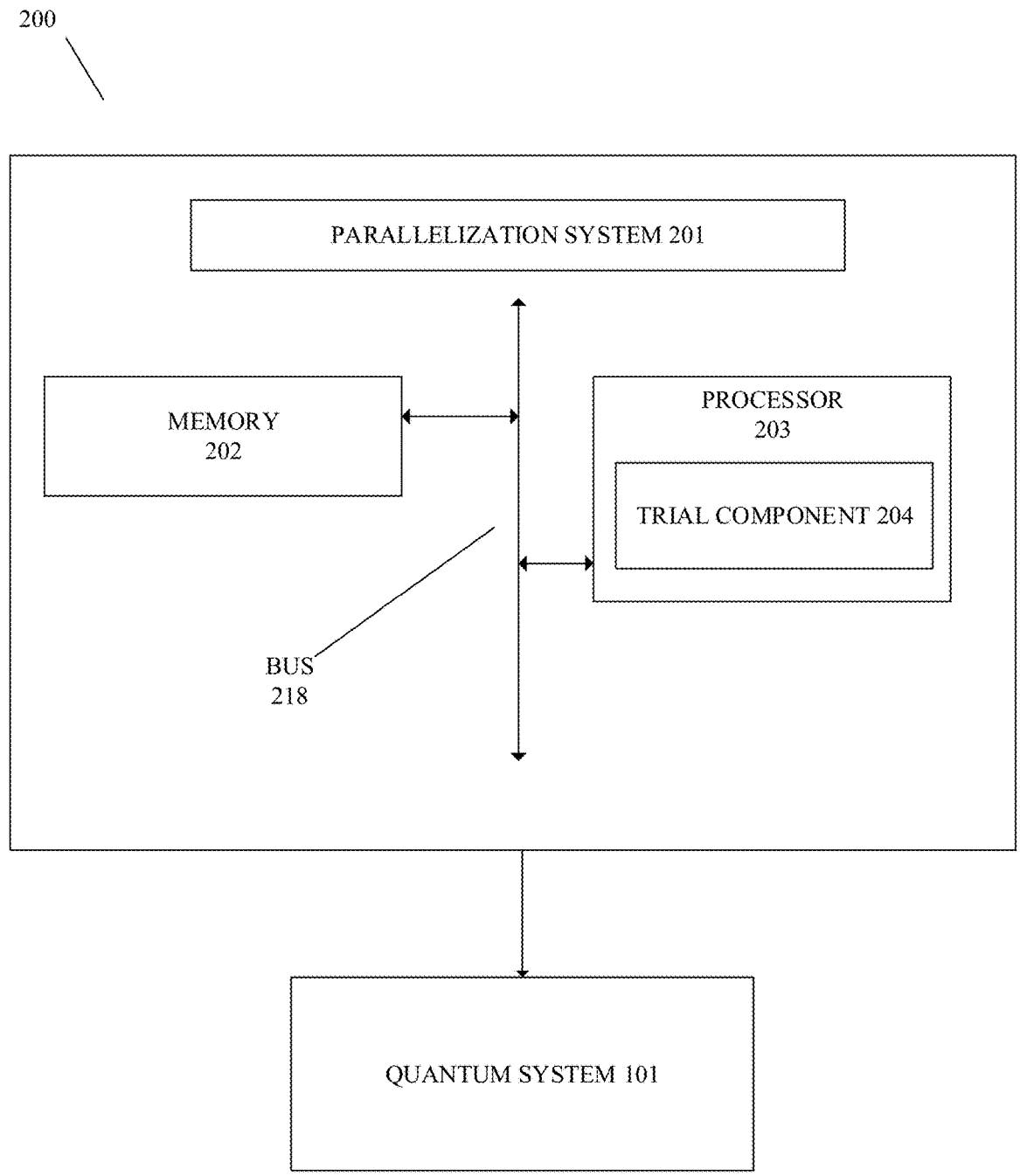
FIG. 2 illustrates a block diagram of an example, non-limiting system that can facilitate multireference parallelization of variational quantum computing to achieve high accuracy with short circuit depths.
Figure 3:
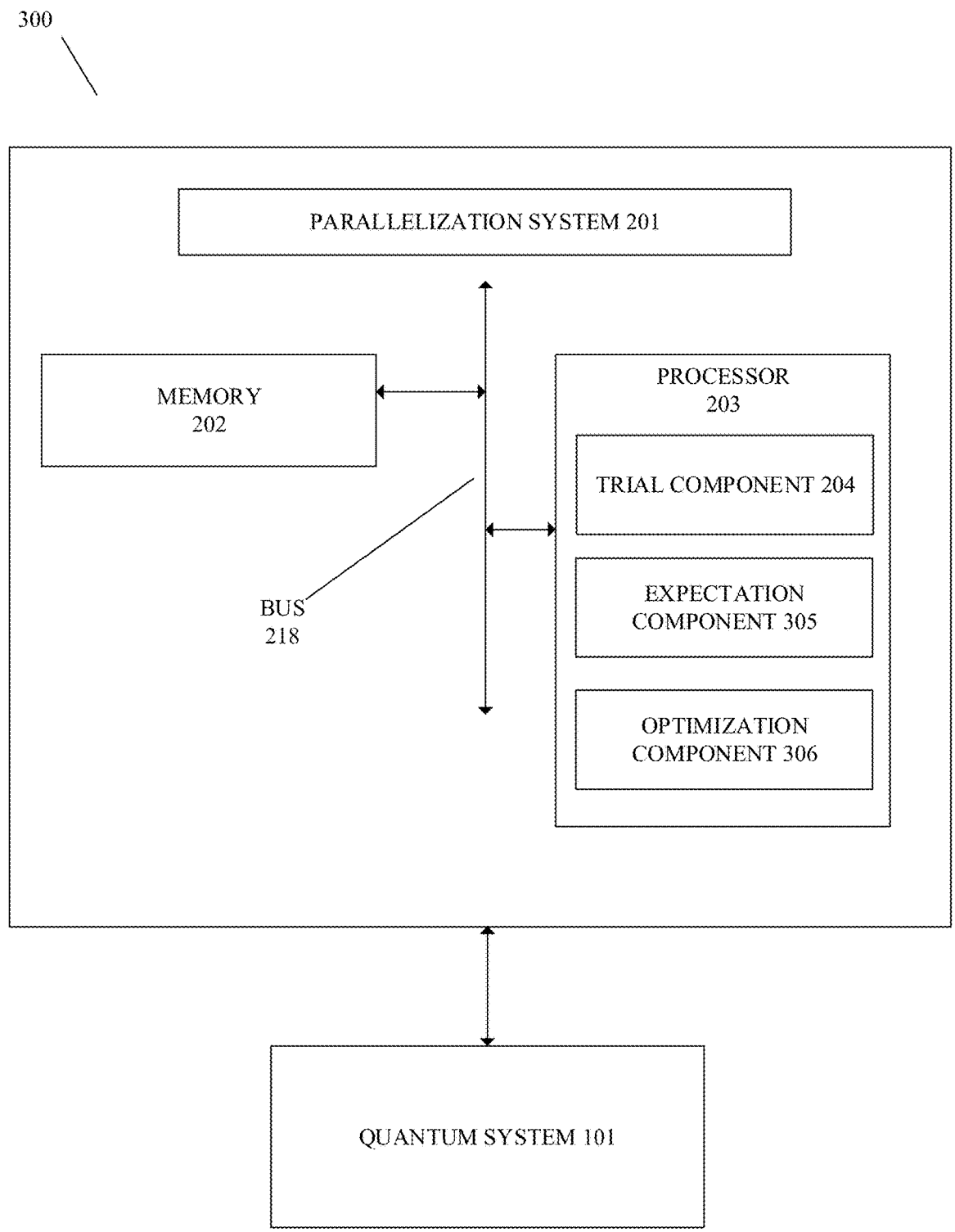
FIG. 3 illustrates a block diagram of an example, non-limiting system that can facilitate multireference parallelization of variational quantum computing to achieve high accuracy with short circuit depths.

FIGS. 2 and 3 illustrates block diagrams of example, non-limiting systems 200 and 300 that can facilitate multi-reference parallelization of variational quantum computing to achieve high accuracy with short circuit depths. System 200 and 300 can each comprise parallelization system 201. Parallelization system 201 of system 200 depicted in FIG. 2 can comprise a memory 202, a processor 203, a trial component 204, a quantum system 101, and/or a bus 218. Parallelization system 201 of system 300 depicted in FIG. 3 can further comprise an expectation component 305 and/or an optimization component 306.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 200, system 300 and/or parallelization system 201 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIGS. 1, 2, 3, and/or other figures disclosed herein.

Memory 202 can store one or more computer and/or machine readable, writable, and/or executable components and/or instructions that, when executed by processor 203 (e.g., a classical processor, a quantum processor, and/or another type of processor), can facilitate performance of operations defined by the executable component(s) and/or instruction(s). For example, memory 202 can store computer and/or machine readable, writable, and/or executable components and/or instructions that, when executed by processor 203, can facilitate execution of the various functions described herein relating to parallelization system 201, trial component 204, expectation component 305, optimization component 306, quantum system 101 and/or another component associated with parallelization system 201.

Memory 202 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 202 are described below with reference to system memory 1016 and FIG. 10. Such examples of memory 202 can be employed to implement any embodiments of the subject disclosure.

Processor 203 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 202. For example, processor 203 can perform various operations that can be specified by such computer and/or machine readable, writable, and/or executable components and/or instructions including, but not limited to, logic, control, input/output (I/O), arithmetic, and/or the like. In some embodiments, processor 203 can comprise one or more central processing unit, multi-core processor, microprocessor, dual microprocessors, microcontroller, System on a Chip (SOC), array processor, vector processor, quantum processor, and/or another type of processor. Further examples of processor 203 are described below with reference to processing unit 1014 and FIG. 10. Such examples of processor 203 can be employed to implement any embodiments of the subject disclosure.

Parallelization system 201, memory 202, processor 203, trial component 204, expectation component 305, optimization component 306, quantum system 101, and/or another component of parallelization system 201 as described herein can be communicatively, electrically, operatively, and/or optically coupled to one another via bus 118 to perform functions of system 200, system 300, parallelization system 201, and/or any components coupled therewith. Bus 218 can comprise one or more memory bus, memory controller, peripheral bus, external bus, local bus, a quantum bus, and/or another type of bus that can employ various bus architectures. Further examples of bus 218 are described below with reference to system bus 1018 and FIG. 10. Such examples of bus 218 can be employed to implement any embodiments of the subject disclosure.

Parallelization system 201 can comprise any type of component, machine device, facility, apparatus, and/or instrument that comprises a processor and/or can be capable of effective and/or operative communication with a wired and/or wireless network. All such embodiments are envisioned. For example, parallelization system 201 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Parallelization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, parallelization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, parallelization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Parallelization system 201 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, parallelization system 201 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between parallelization system 201 and external systems, sources, and/or devices (e.g., computing devices, communication devices, and/or another type of external system, source, and/or device).

Parallelization system 201 can comprise one or more computer and/or machine readable, writable, and/or executable components and/or instructions that, when executed by the processor 203 (e.g., a classical processor, a quantum processor, and/or another type of processor), can facilitate performance of operations defined by such component(s) and/or instruction(s). Further, in numerous embodiments, any component associated with parallelization system 201, as described herein with or without references to the various figures of the subject disclosure, can comprise one or more computer and/or machine readable, writable, and/or executable components and/or instructions that, when executed by processor 203, can facilitate performance of operations defined by such component(s) and/or instruction(s). For example, trial component 204, expectation component 305, optimization component 306, quantum system 101, and/or any other components associated with parallelization system 201 as disclosed herein (e.g., communicatively, electronically, operatively, and/or optically coupled with and/or employed by parallelization system 201), can comprise such computer and/or machine readable, writable, and/or executable component(s) and/or instruction(s). Consequently, according to numerous embodiments, parallelization system 201 and/or components associated therewith as disclosed herein, can employ processor 203 to execute such computer and/or machine readable, writable, and/or executable component(s) and/or instruction(s) to facilitate performance of one or more operations described herein with reference to parallelization system 201 and/or any such components associated therewith.

Parallelization system 201 can facilitate (e.g., via processor 203) performance of operations executed by and/or associated with trial component 204, expectation component 305, optimization component 306, quantum system 101, and/or another component associated with parallelization system 201 as disclosed herein. For example, as described in detail below, parallelization system 201 can facilitate (e.g., via processor 203): preparing a multireference trial state based on a qubit operator, by applying a unitary circuit operator to a sum of selected initial configurations. In another example, as described in detail below, parallelization system 201 can further facilitate (e.g., via processor 203): computing an expectation value of the qubit operator from the selected initial configurations.

Trial component 204 can prepare a multireference trial state based on a qubit operator, by applying a unitary circuit operator to a sum of selected initial configurations. As referenced herein a "trial state" is a state prepared by a quantum circuit in order to approximate the ground state of a molecule. For example, trial component 204 can receive a molecule to approximate the ground state of. Trial component 204 can then signal a quantum circuit to encode the fermionic molecular Hamiltonian of the molecule into a qubit operator. In an embodiment, trial component 204 can signal quantum system 101 to encode the fermionic molecular Hamiltonian. In another embodiment, trial component 204 can include quantum hardware and/or a quantum simulator to encode the fermionic molecular Hamiltonian.

As defined herein a "multireference trial state" is a trial state which comprises multiple initial configurations for the quantum circuit as opposed to a "single reference trial state" which comprises a single initial configuration for the quantum circuit. In an embodiment, the multireference trial state can be prepared by applying a unitary circuit operator to a sum of selected initial configurations. It should be appreciated that the multireference nature of the trial state is achieved due to the summation of multiple initial configurations. In an example, the unitary circuit operator can be a parameterized quantum circuit and the initial configurations can be a series of single determinant states and corresponding complex amplitudes. In an embodiment, classical preprocessing can be used to select the starting configurations and a set of parameters for the parameterized circuit. For example, trial component 204 can receive as input an initial set of parameters and starting configurations that can then be passed to quantum system 101 to produce the trial state of the fermionic molecular Hamiltonian. In an embodiment, the set of parameters can be input by a user, or in another embodiment, trial component 204 can select the set of parameters based on a default set. In a further embodiment, trial component 204 can select the set of parameters based on feedback from optimization component 306 as discussed in detail below. In an embodiment, the starting configurations can be selected based on application type. For example, if parallelization system 201 is performing a VQE application related to quantum chemistry, the starting configurations can be a set of singly-excited slater determinants starting from a reference Hartree-Frock state. In another embodiment, trial component 204 can select the number of starting configurations to include in the trial state. For example, given a relatively simple molecule to simulate, fewer starting configurations may be used, and a relatively low number of starting configurations can be selected. Conversely, given a relatively complex molecule to simulate, more starting configurations may be used, and a relatively high number of starting configurations can be selected. In a further embodiment, the number of selected starting configurations can be determined based on the number of qubits in the parameterized circuit. For example, the number of selected starting configurations, $N_c$ can scale by a factor $\mathcal{O}(N^2)$ where N is the number of qubits in the parameterized circuit.

Figure 6:
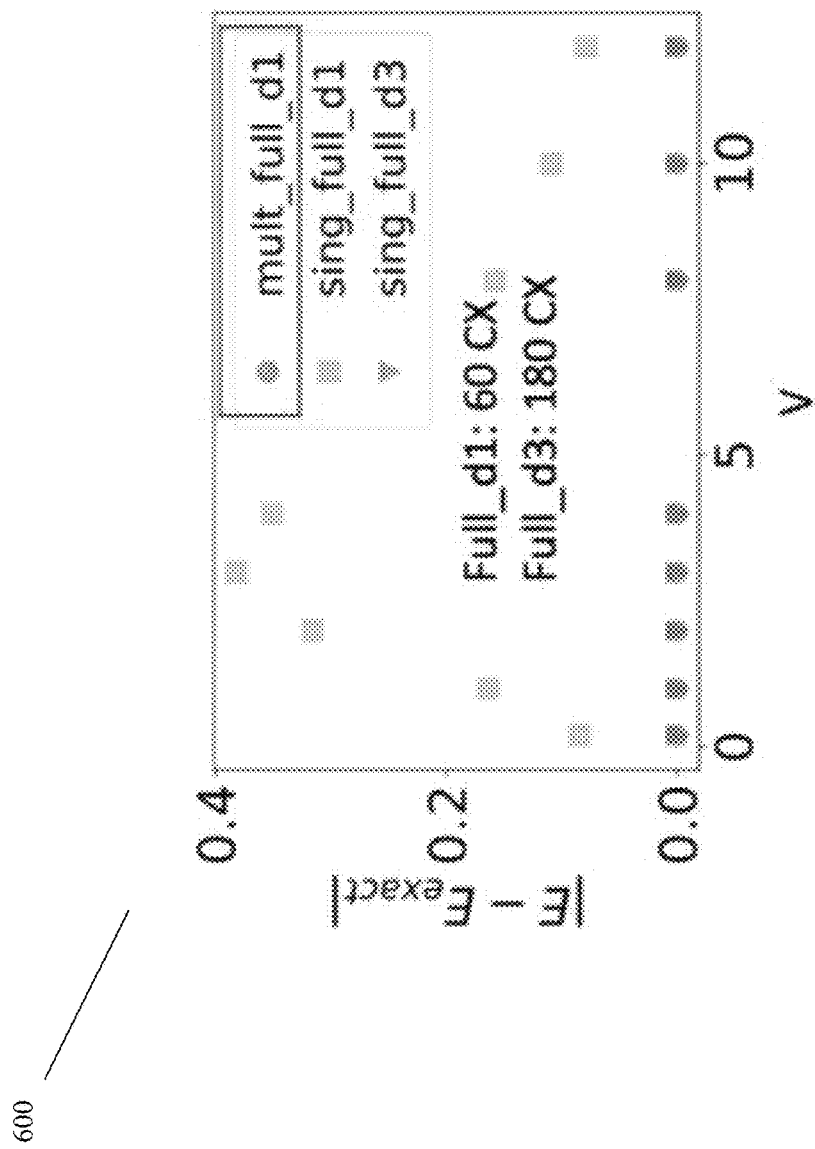
FIG. 6 illustrates a graph of a comparison between the performance in modeling a Hubbard model on a graphene lattice using a multireference trial state and a single reference trial state in accordance with one or more embodiments described herein.
Figure 7:
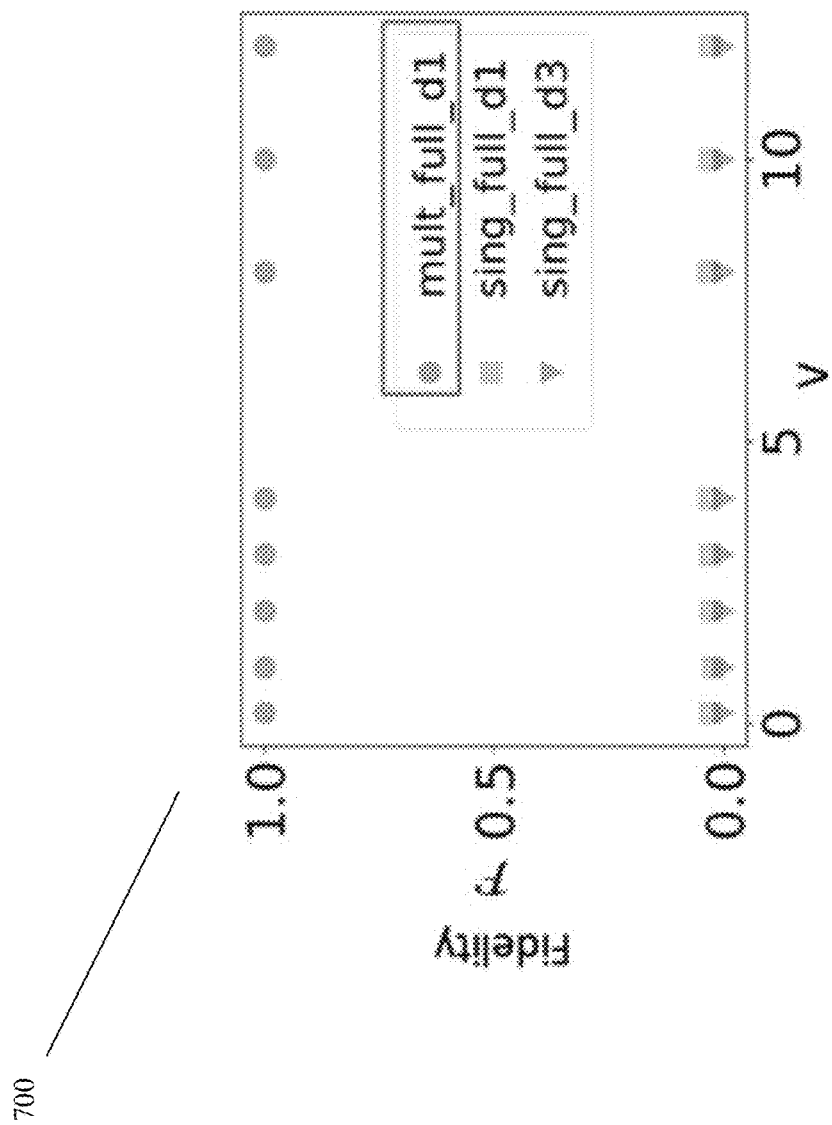
FIG. 7 illustrates a graph of a comparison between the performance in modeling a Hubbard model on a graphene lattice using a multireference trial state and a single reference trial state in accordance with one or more embodiments described herein.

In an embodiment, trial component 204 can define the multireference trial state to be produced by a quantum circuit as:

$$|\Psi\rangle = U(\theta) \sum_i^{N_c} c_i |\psi_i\rangle.$$

wherein $c_i$ are complex amplitudes, $U(\theta)$ is a parametrized quantum circuit with parameters $\theta$, $|\psi_i\rangle$ are single determinant states, and $N_c$ is the number of starting configurations. For example, trial component 204 can receive as input a parameterized circuit and parameters $U(\theta)$, a set of singly excited Slater determinants $|\psi_i\rangle$, a set of complex amplitudes $c_i$, and a number of starting configurations $N_c$ as described above. Trial component 204 can then define a trial state by plugging the selected values in to the above shown formula. Trial component 204 can then pass this definition of the multireference trial state to quantum system 101 in order to prepare a trial state of the encoded molecule. In another embodiment, trial component 204 can pass the definition of the multireference trial state to a quantum simulator which can prepare the a trial state of the encoded molecule. It should be appreciated that by preparing a multireference trial state, parallelization system 201 can achieve high accuracy with shorter circuit depth than using a single reference trial state because different configurations are introduced in the wavefunction in parallel from unitaries $U_j$ and $U_i$ instead of applying a longer quantum circuit, a sequence of $U_j$ and $U_i$ for instance, as shown in FIGS. 6 and 7 described below.

Expectation component 305 can compute the expectation value of the qubit operator from the selected initial configuration. As described above, the goal of a variational quantum eigensolver is to approximate a molecule in the ground state. Thus, the expectation value, or energy of the qubit operator can be used to evaluate the performance of the variational quantum eigensolver. For example, expectation component 305 can take a measurement of all qubits in the circuit $U(\theta)$ after using circuit $U(\theta)$ to facilitate reinitialization of the circuit using a new trial state. This can be done by signaling quantum system 101 to measure the qubits in circuit $U(\theta)$. As a Hamiltonian is an operator that fully defines a quantum circuit, the measurement can be used to determine the Hamiltonian. This measurement can be used with a cost function in order to determine the expectation value of the qubit operator which is encoded with the fermionic molecular Hamiltonian of the molecule in question. In an embodiment, expectation component 305 can compute the expectation value of the fermionic molecular Hamiltonian using the formula:

$$E = \langle \Psi | H | \Psi \rangle \quad (2)$$
$$= \sum_i \sum_j c_i c_j^* \langle \psi_j | U^\dagger(\theta) H U(\theta) | \psi_i \rangle.$$

wherein H is the fermionic Hamiltonian, $\psi_i$ and $\psi_j$ are starting configurations, and $U(\theta)$ is the parameterized circuit with the parameters $\theta$. This formula can be operatively translated into:

$$E = \sum_i \sum_j c_i c_j^* \langle vac | U_j^\dagger(\theta) H U_i(\theta) | vac \rangle$$

wherein $|vac\rangle$ is the vacuum state (all qubits in the circuit $U(\theta)$ in the zero state) and $U_j$ and $U_i$ are unitaries of parameterized circuit $U(\theta)$. In an embodiment, expectation component 305 can assume that the unitaries $U_j$ and $U_i$ only differ from each other by a short initial subcircuit that creates the starting states $|\psi_i\rangle$. This assumption allows for significant simplification of the circuit $U(\theta)$ because different configurations are introduced in the wavefunction in parallel from $U_j$ and $U_i$ instead of applying a longer quantum circuit. In an embodiment, expectation component 305 can compute the expectation value using classical hardware. In another embodiment, expectation component 305 can compute the expectation value on quantum hardware or a quantum simulator. For example, expectation component 305 can signal quantum system 101 to compute the expectation value using the formula described above. In this example, the expectation value can be computed using an extended quantum register which contains an ancilla qubit, wherein the ancilla qubit controls the activation of the unitaries $U_j$ and $U_i$.

Optimization component 306 can optimize parameters of the parameterized circuit based on the expectation value of the qubit operator. In the case of a fermionic molecular Hamiltonian, the lowest eigen state of the Hamiltonian corresponds with the ground state of the molecule encoded in the fermionic molecular Hamiltonian. Further, the eigen state is dependent on the expectation value of the qubit operator containing the Hamiltonian. Therefore, the minimized expectation value corresponds to the lowest eigenstate, and thus the ground state of the molecule. As such, optimization component 306 can optimize parameters of the parameterized circuit by selecting parameters in order to minimize the expectation value produced by the cost function described in detail in reference to expectation component 305. In order to achieve this optimization, optimization component 306 can use a classical optimization technique such as batch gradient descent, stochastic gradient descent, mini-batch gradient descent, or any other optimization technique applicable with a cost function. Examples of optimization algorithms optimization component 306 can use include Adam, RMSprop, Adagrad, or another applicable algorithm. Once optimization component 306 has selected a new set of parameters for the parametrized circuit, based on one of the optimization methods described above, optimization component 306 can signal trial component 204 to prepare a new trial state using the new parameters. Expectation component 305 can then compute the expectation value of the new trial state, which optimization component 306 can use to optimize again.

It should be appreciated, that the loop of preparing a trial state, evaluating, and optimizing can be repeated over multiple iterations. For example, in an embodiment, the loop can run for a set number of iterations. In another example, the loop can run until a performance threshold is achieved. For example, in an embodiment optimization component 306 can store a record of the expectation value of each iteration of the loop. When optimization component 306 receives an expectation value from expectation component 305, optimization component 306 can compare the expectation value to the expectation value of the previous iteration. If the decrease between the expectation value and the previous expectation value is less than or equal to a performance threshold, then further optimization may not provide significant improvement in accuracy of the representation of the ground state of the molecule, and optimization component 306 can signal parallelization system 201 to not perform further iterations of the loop.

It should be appreciated that through the use of a multireference trial state and the cost function described in detail above, that the depth and complexity of the parameterized circuit used in a variational quantum eigensolver can be reduced significantly while still maintaining accuracy. Due to the limitations on quantum hardware depth and complexity, this allows the performance of variational quantum computing on simpler quantum hardware, as well as allowing for more complex computing to be performed more efficiently. For example, as described below in further detail, parallelization system 201 can achieve similar results on circuits that are four times shorter than other variational quantum computing systems.

Figure 4:
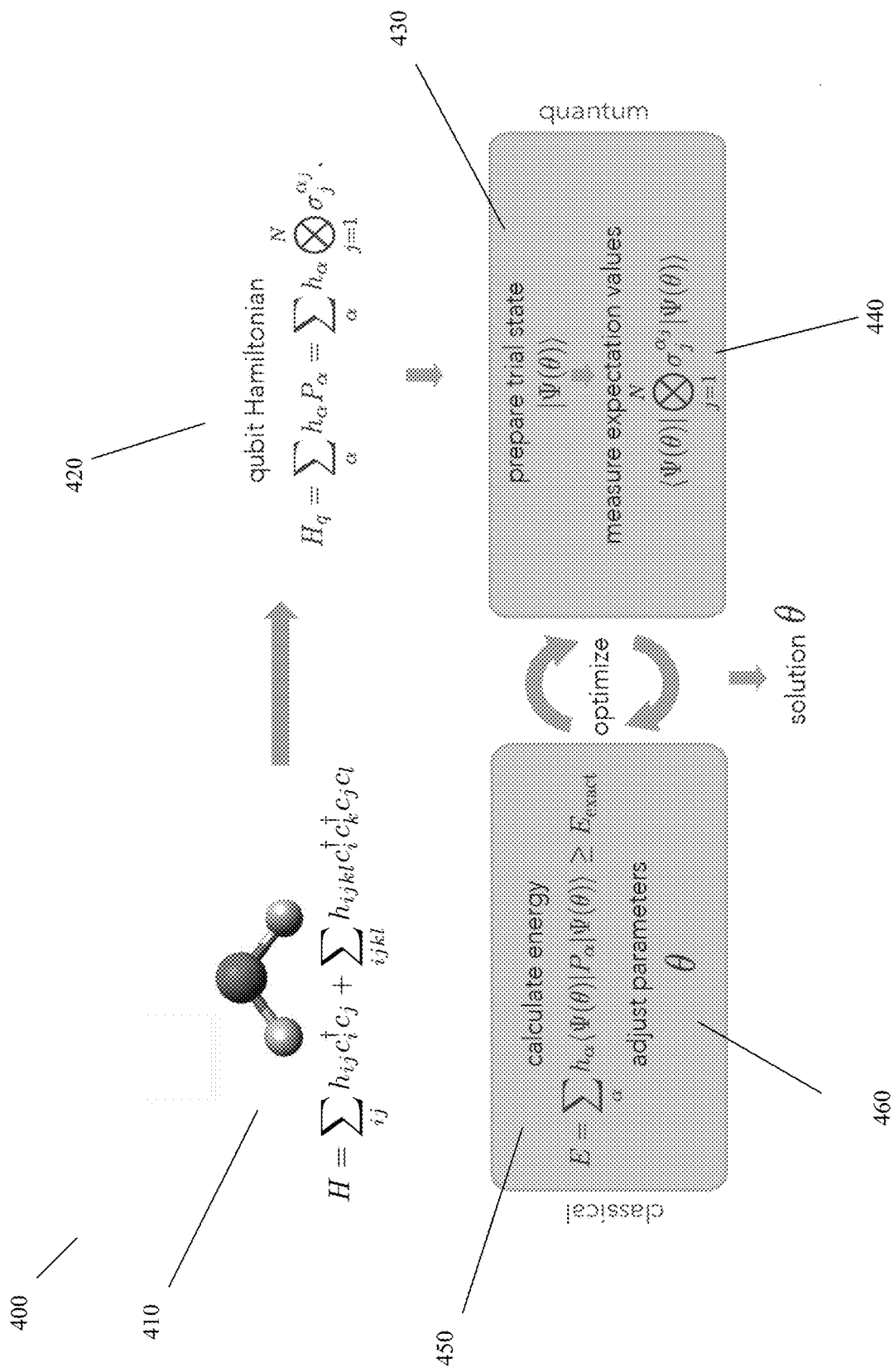
FIG. 4 illustrates a flow diagram of an example, non-limiting computer-implemented method that can facilitate parallelization of a variational quantum eigensolver with high accuracy and short circuit depth in accordance with one or more embodiments described herein.

FIG. 4 illustrates a flow diagram of an example, non-limiting computer-implemented method 400 that can facilitate parallelization of a variational quantum eigensolver with high accuracy and short circuit depth in accordance with one or more embodiments described herein. Repetitive description of like elements and/or processes employed in respective embodiments is omitted for sake of brevity.

At 410, computer-implemented method 400 can comprise receiving, by a system (e.g., parallelization system 201 and/or trial component 204) operatively coupled to a processor (e.g., processor 203), a molecule to simulate the ground state of. For example, as described above in reference to FIG. 2, trial component 204 can receive a molecule to simulate the ground state of, in this case a water molecule.

At 420, computer-implemented method 400 can comprise encoding, by the system (e.g., parallelization system 201 and/or trial component 204), a fermionic molecular Hamiltonian of the molecule into a qubit operator.

At 430, computer-implemented method 400 can comprise preparing, by the system (e.g., parallelization system 201 and/or trial component 204), a multireference trial state based on the qubit operator. For example, as described above in reference to FIGS. 2 and 3, trial component 204 can define the trial state as a unitary circuit operator, such as a parameterized circuit, applied to a sum of selected initial configurations, such as single determinant states. Trial component 204 can then pass the definition of the trial state to quantum system 101, which can prepare the trial state using the parameterized circuit.

At 440, computer-implemented method 400 can comprise computing, by the system (e.g., parallelization system 201 and/or expectation component 305), an expectation value of the qubit operator from the selected initial configurations. For example, as described above in reference to FIGS. 2 and 3, expectation component 305 can request a measurement of all qubits in the parameterized circuit from quantum system 101 after preparation of the trial state. Expectation component 305 can then compute the expectation value using the measurement and a cost function. In an embodiment, computation of the expectation value can be performed on quantum hardware, either by quantum system 101 or by expectation component 305 directly, through the use of an extended quantum register and an ancilla qubit.

At 450, computer-implemented method 400 can comprise determining, by the system (e.g., parallelization system 201 and/or optimization component 306), whether the expectation value has been minimized. As described above in reference to FIGS. 2 and 3, the ground state of the molecule is reached when the eigenvalue is at its lowest point, which is achieved by minimizing the expectation value. For example, optimization component 306 can use the expectation value computed by expectation component 305 to determine if the expectation value has a difference from a previous expectation value that is less than or equal to a threshold. In another embodiment, optimization component 306 can determine to continue the optimization loop based on a number of iterations performed.

At 460, computer-implemented method 400 can comprise optimizing, by the system (e.g., parallelization system 201 and/or optimization component 306), the parameters of the parametrized circuit based on the expectation value of the qubit operator. For example, as described above in reference to FIGS. 2 and 3, optimization component 306 can pass the expectation value to an optimization method, such as a stochastic gradient descent optimizer, in order to produce a new set of parameters for the parameterized circuit that will produce a lower expectation value, and thus a trial state closer to the ground state of the molecule. Optimization component 306 can then pass this new set of parameters to trial component 204 and signal trial component 204 to prepare a new trial state using the new parameters. This process of preparing a trial state, measuring the expectation value, and optimizing parameters can be repeated over multiple iterations.

Figure 5A:
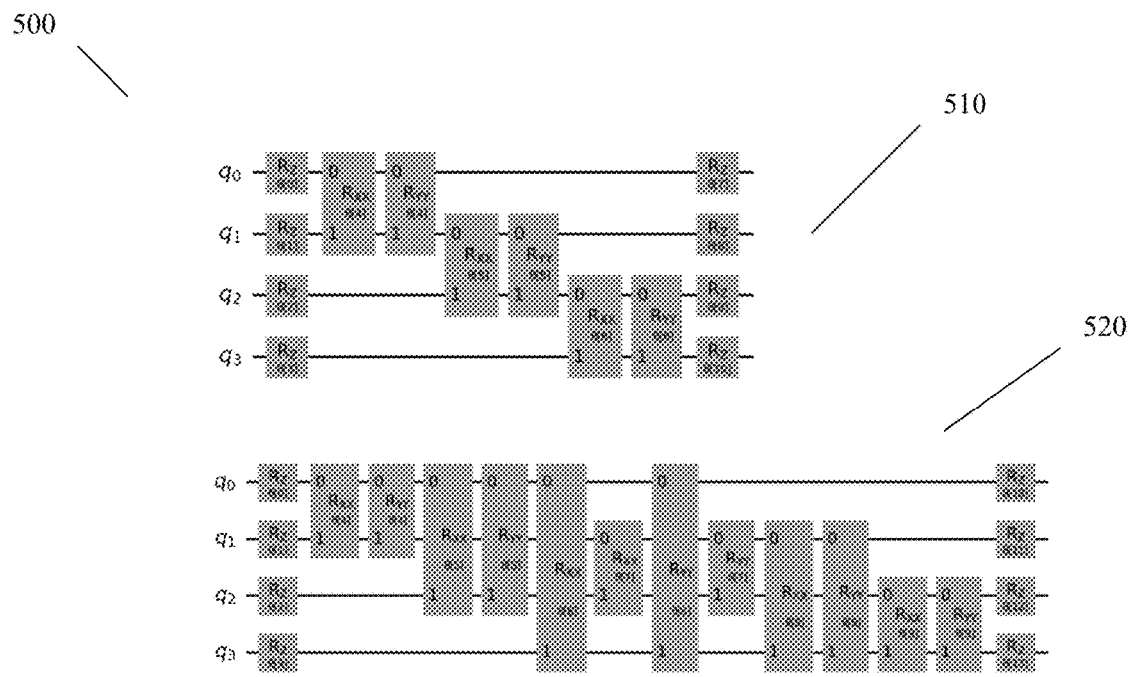
FIG. 5A illustrates a diagram of non-limiting examples of parameterized circuits that can facilitate parallelization of a variational quantum computing with high accuracy and short circuit depth in accordance with one or more embodiments described herein.

FIG. 5A illustrates a diagram 500 of non-limiting examples of parameterized circuits that can facilitate parallelization of a variational quantum computing with high accuracy and short circuit depth in accordance with one or more embodiments described herein.

Diagram 500 comprises two parameterized circuits, linear circuit 510 and full circuit 520. Linear circuit 510 has a depth of 12 controlled NOT (CNOT) quantum gates while full circuit 520 has a depth of 24 CNOT quantum gates. Additionally, not shown is a third quantum circuit, full circuit d2, which has a depth of 48 CNOT quantum gates.

Figure 5B:
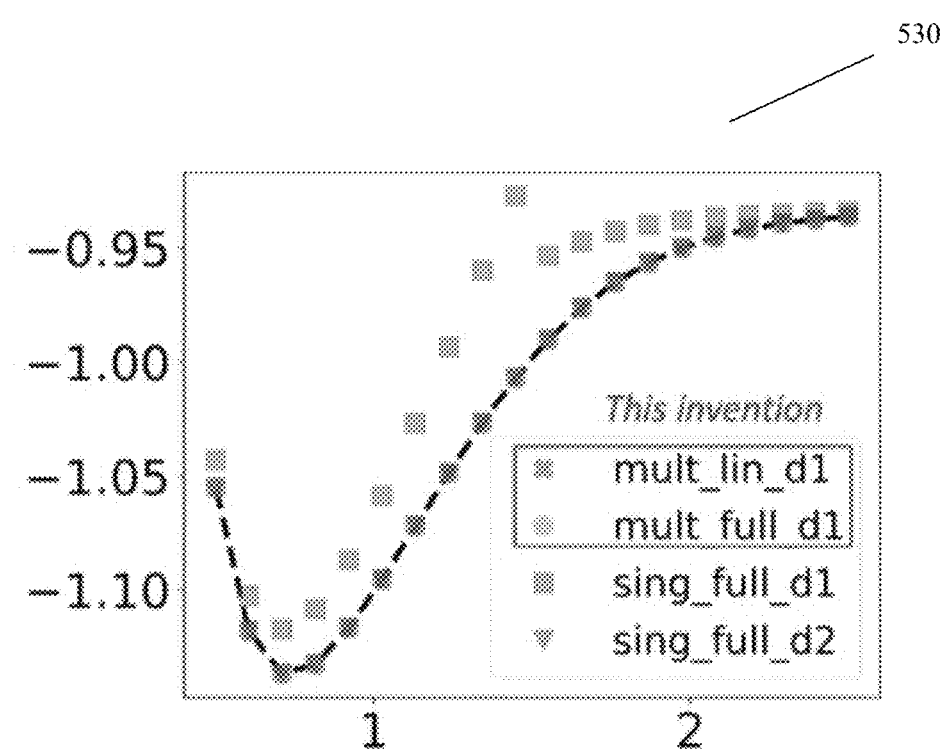
FIG. 5B illustrates a graph of a comparison between the performance in measuring the dissociation of a hydrogen molecule using a multireference trial state and a single reference trial state in accordance with one or more embodiments described herein.

FIG. 5B illustrates a graph 530 of a comparison between the performance in measuring the dissociation of a hydrogen molecule using a multireference trial state and a single reference trial state in accordance with one or more embodiments described herein.

As the disassociation a hydrogen molecule, or the energy for different bond lengths between the hydrogen atoms is known, it serves as an effective test. The y-axis of graph 530 shows the energy between the hydrogen atoms, while the x-axis shows the iteration of the variation quantum eigensolver. Here, the black curve present on graph 530 illustrates ideal performance based on the known values. Graph 530 comprises four tests: multi_lin_d1 which is a multireference trial state prepared on linear circuit 510 and shown as blue xs, mult_full_d1 which a multireference trial state prepared on full circuit 520 and shown as orange circles, sing_full_d1 which is a single reference trial state prepared on full circuit 520 and is shown as green squares, and sing_full_d2 which is a single reference trial state prepared on full circuit d2 and is shown as red triangle. As shown, mult_full_d1 has improved accuracy over sing_full_d1, despite mutl_full_d1 and sing_full_d1 being prepared using the same parameterized circuit. Additionally, mult_lin_d1 as shown on graph 530 has improved accuracy when compared to sing_full_d1 despite using a circuit depth of half of sing_full_d1 (12 CNOT gates vs. 24 CNOT gates). Furthermore, mult_lin_d1, as shown on graph 530, has the same accuracy as sing_full_d2, despite using a circuit with a depth four times shorter (12 CNOT gates vs. 48 CNOT gates).

It should be appreciated that even in performance of the above described relatively simple variational computing example, using a multireference trial state as opposed to a single reference trial state enables an increase in accuracy of calculations and simultaneously a decrease in circuit depth. Furthermore, it should be appreciated that due to the decrease in circuit depth, a multireference trial state can allow for problems that are not performable on quantum hardware due to hardware restrictions (such as circuit depth) to be performed on current hardware.

FIG. 6 illustrates a graph 600 of a comparison between the performance in modeling a Hubbard model on a graphene lattice using a multireference trial state and a single reference trial state in accordance with one or more embodiments described herein.

The Hubbard model features electrons which can hop on the sites of a honeycomb lattice and feel Coulomb repulsion, defined as V, only if they occupy neighboring sites. The y-axis of graph 600 represents the difference between the measured expectation value and the exact energy of the ground state, while the x-axis represents the Coulomb repulsion of the electrons in the model. Graph 600 shows three tests: mult_full_d1 which is a multireference trial state prepared on a 60 controlled X (CX) quantum gate circuit and shown as blue circles, sing_full_d1 which is a single reference trial state prepared on a 60 CX quantum gate circuit and shown as orange squares, and sing_full_d3 which is a single reference trial state prepared on a 180 CX quantum gate circuit and shown as green triangles. As shown by graph 600, mult_full_d1 achieves better accuracy than sing_full_d1, which uses the same circuit, and achieves accuracy at least equal with sing_full_d3, despite using a circuit that is one third the depth of sing_full_d3 (60 CX gates vs. 180 CX gates).

FIG. 7 illustrates a graph 700 of a comparison between the performance in modeling a Hubbard model on a graphene lattice using a multireference trial state and a single reference trial state in accordance with one or more embodiments described herein.

The y-axis of graph 700 represents accuracy of the ground state as shown by fidelity, and the x-axis represents Coulomb repulsion of the electrons in the model. Graph 700 shows three tests: mult_full_d1 which is a multireference trial state prepared on a 60 CX quantum gate circuit and shown as blue circles, sing_full_d1 which is a single reference trial state prepared on a 60 CX quantum gate circuit and shown as orange squares, and sing_full_d3 which is a single reference trial state prepared on a 180 CX quantum gate circuit and shown as green triangles. As shown by graph 700, both sing_full_d1 and sing_full_d2 do not faithfully represent the ground state of the Hubbard model as they have very low fidelities. In contrast, despite using a shorter circuit, mult_full_d1 achieves a high degree of fidelity and thus an accurate representation of the true ground state.

Figure 8:
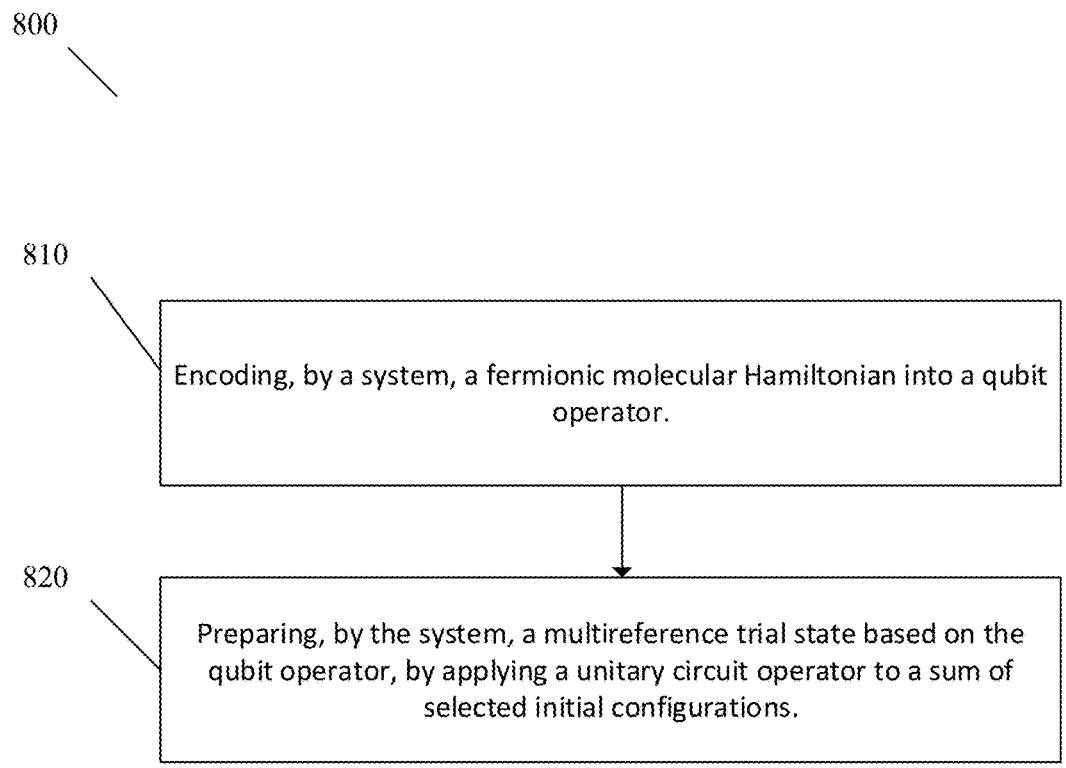
FIG. 8 illustrates a flow diagram of an example, non-limiting computer-implemented method that can facilitate multireference parallelization of variational quantum computing to achieve high accuracy with short circuit depths in accordance with one or more embodiments described herein.

FIG. 8 illustrates a flow diagram of an example, non-limiting computer-implemented method 800 that can facilitate multireference parallelization of variational quantum computing to achieve high accuracy with short circuit depths in accordance with one or more embodiments described herein. Repetitive description of like elements and/or processes employed in respective embodiments is omitted for sake of brevity.

At 810, computer-implemented method 800 can comprise encoding, by a system (e.g., parallelization system 201 and/or trial component 204) operatively coupled to a processor (e.g., processor 203), a fermionic Hamiltonian into a qubit operator.

At 820, computer-implemented method 800 can comprise preparing, by the system (e.g., parallelization system 201 and/or trial component 204), a multireference trial state based on the qubit operator, by applying a unitary circuit operator to a sum of selected initial configurations. For example, as described above in reference to FIGS. 2 and 3, trial component 204 can define the trial state as a unitary circuit operator, such as a parameterized circuit, applied to a sum of selected initial configurations, such as single determinant states. Trial component 204 can then pass the definition of the trial state to quantum system 101, which can prepare the trial state using the parameterized circuit.

Figure 9:
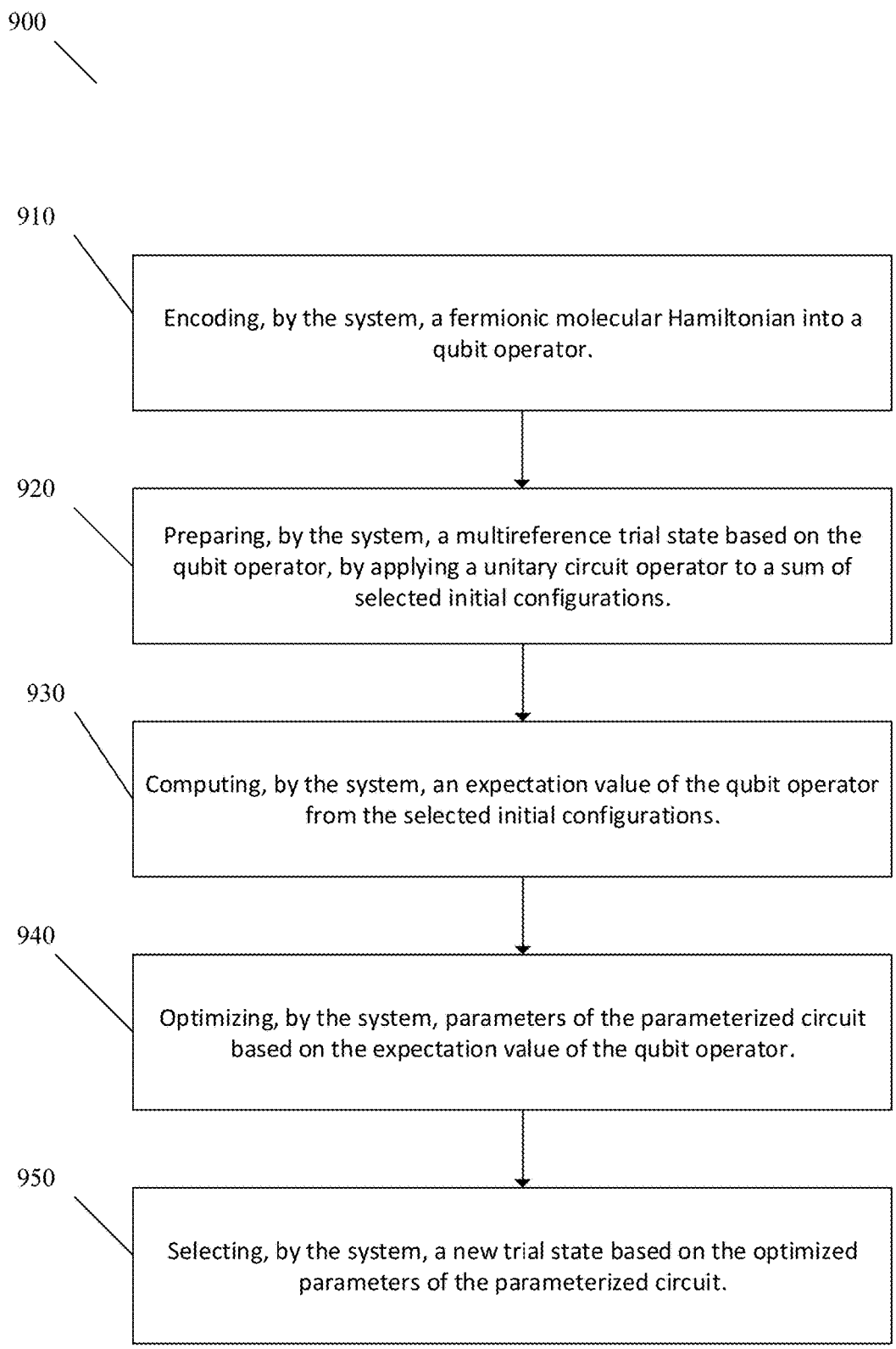
FIG. 9 illustrates a flow diagram of an example, non-limiting computer-implemented method that can facilitate multireference parallelization of variational quantum computing to achieve high accuracy with short circuit depths in accordance with one or more embodiments described herein.

FIG. 9 illustrates a flow diagram of an example, non-limiting computer-implemented method 900 that can facilitate multireference parallelization of variational quantum computing to achieve high accuracy with short circuit depths in accordance with one or more embodiments described herein. Repetitive description of like elements and/or processes employed in respective embodiments is omitted for sake of brevity.

At 910, computer-implemented method 900 can comprise encoding, by a system (e.g., parallelization system 201 and/or trial component 204) operatively coupled to a processor (e.g., processor 203), a fermionic Hamiltonian into a qubit operator.

At 920, computer-implemented method 900 can comprise preparing, by the system (e.g., parallelization system 201 and/or trial component 204), a multireference trial state based on the qubit operator, by applying a unitary circuit operator to a sum of selected initial configurations. For example, as described above in reference to FIGS. 2 and 3, trial component 204 can define the trial state as a unitary circuit operator, such as a parameterized circuit, applied to a sum of selected initial configurations, such as single determinant states. Trial component 204 can then pass the definition of the trial state to quantum system 101, which can prepare the trial state using the parameterized circuit.

At 930, computer-implemented method 900 can comprise computing, by the system (e.g., parallelization system 201 and/or expectation component 305), an expectation value of the qubit operator from the selected initial configurations. For example, as described above in reference to FIGS. 2 and 3, the expectation value can be used to calculate the energy of the qubit operator, and thus determine if the trial state is an accurate representation of the ground state of the molecule encoded in the qubit operator.

At 940, computer-implemented method 900 can comprise optimizing, by the system (e.g., parallelization system 201 and/or optimization component 306), parameters of the parameterized circuit based on the expectation value of the qubit operator. For example, as described above in reference to FIGS. 2 and 3, optimization component 306 can optimize the parameters by adjusting the parameters so that a new trial state will have a lower expectation value. This optimization can be implemented through the use of an optimization algorithm such as a stochastic gradient descent optimizer.

At 950, computer-implemented method 900 can comprise selecting, by they system (e.g., parallelization system 201, optimization component 306, and/or trial component 204), a new trial state based on the optimized parameters of the parameterized circuit. For example, as described above in reference to FIGS. 2 and 3, trial component 204 can define a new trial state using the optimized parameters of the parameterized circuit. The definition of the new trial state can then be prepared by quantum system 101, an expectation value computed by expectation component 305, and the parameters optimized again by optimization component 306. It should be appreciated that this loop can iterate multiple times in order to produce better results.

Parallelization system 201 can provide technical improvements to systems, devices, components, operational steps, and/or processing steps associated with variational quantum computing and variational quantum eigensolvers. For example, parallelization system 201 can prepare a multireference trial state based on a qubit operator, by applying a unitary circuit operator to a sum of selected initial configurations. In the above example, it should be appreciated that parallelization system 201 can reduce quantum circuit depth used in variational quantum computing through the use of a multireference trial state, thereby reducing resource and/or hardware usage by utilizing shorter quantum circuits.

In the above examples, it should be appreciated that parallelization system 201 can provide technical improvements to a processing unit associated with parallelization system 201 and/or quantum system 101. For example, by reducing quantum circuit depth used in variational quantum computing, complex variational quantum computing tasks can be performed on shorter quantum circuits, thereby reducing the workload of a processing unit (e.g., processor 203) and/or quantum system 101. In these examples, by reducing the workload of such a processing unit (e.g., processor 203) and/or quantum system 101, parallelization system 201 can thereby facilitate improved performance, improved efficiency, and/or reduced computational cost associated with such a processing unit.

Additionally, by reducing circuit depth, parallelization system 201 can provide technological improvements to quantum systems when approximating complex molecular systems. As circuit depth is a limitation on quantum systems, the decrease in circuit depth provided by parallelization system 201 and the use of a multireference trial state can allow for quantum systems to approximate complex molecular systems that cannot otherwise be approximated on quantum systems using a single reference trial state. Furthermore, by reducing circuit depth, and therefore quantum computational intensity, parallelization system 201 can enable the use of quantum systems with reduced circuit depth, enabling quantum systems that are cheaper and/or easier to manufacture to approximate molecular systems.

Parallelization system 201 can employ hardware and or software to solve problems that are highly technical in nature, that are not abstract and that cannot be performed as a set of mental acts by a human. In some embodiments, one or more processes described herein can be performed by one or more specialized quantum computers (e.g., a specialized processing unit, a specialized classical computer, a specialized quantum computer, and/or another type of specialized computer) to execute defined tasks related to the various technologies identified above. Parallelization system 201, and/or components thereof, can be employed to solve new problems that arise through advancements in employment of quantum computing systems, cloud computing system, computer architecture, and/or another technology.

It is to be appreciated that parallelization system 201 can utilize various combinations of electrical components, mechanical components, and circuitry that cannot be replicated in the mind of a human or performed by a human, as the various operations that can be executed by parallelization system 201 and/or components thereof as described herein are operations that are greater than the capability of a human mind. For instance, the amount of data processed, the speed of processing such data, or the types of data processed by parallelization system 201 over a certain period of time can be greater, faster, or different that the amount, speed, or data type that can be processed by a human mind over the same period of time. In another example, a human, or even thousands of humans, cannot efficiently, accurately and/or effectively execute one or more quantum programs in the time that one or more embodiments described herein can facilitate this process. And, neither can the human mind nor a human with pen and paper electronically execute quantum programs as conducted by one or more embodiments described herein.

According to several embodiments, parallelization system 201 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that parallelization system 201 can include information that is impossible to obtain manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
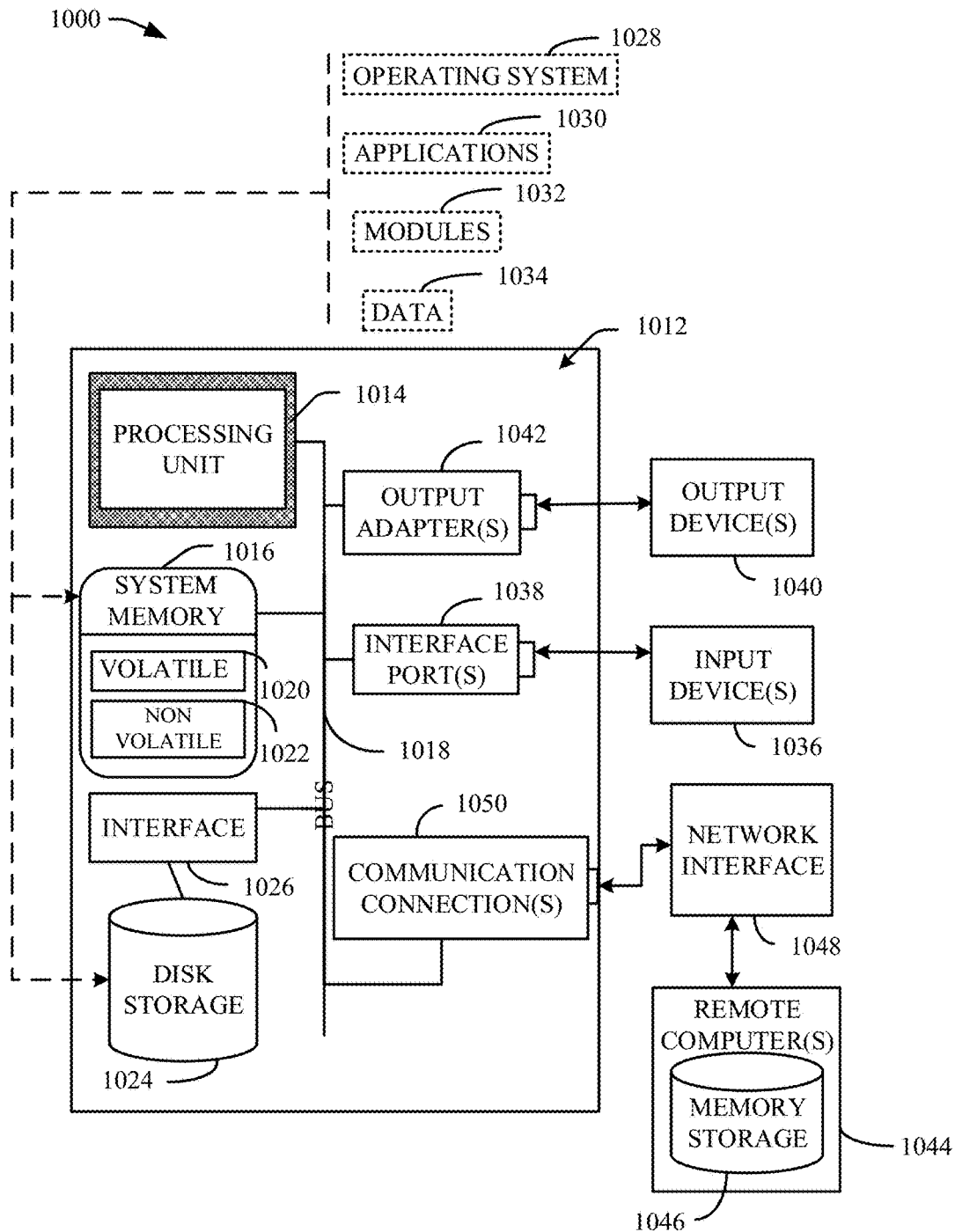
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 824, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 846 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components;
a processor that executes at least one of the computer executable components that:
encodes a fermionic molecular Hamiltonian into a qubit operator; and
prepares a multireference trial state based on the qubit operator, by applying a unitary circuit operator to a sum of selected initial configurations.

2. The system of claim 1, wherein the multireference trial state comprises:

$$|\Psi\rangle = U(\theta) \sum_i^{N_c} c_i |\psi_i\rangle.$$

wherein $c_i$ are complex amplitudes, $U(\theta)$ is a parameterized quantum circuit, $N_c$ is a number of selected initial configurations, and $|\psi_i\rangle$ are single determinant states.

3. The system of claim 2, wherein the at least one of the computer executable components further:
computes an expectation value of the qubit operator from the selected initial configurations.

4. The system of claim 3, wherein the expectation value is defined as:

$$E = \sum_i \sum_j c_i c_j^* \langle vac | U_j^\dagger(\theta) H U_i(\theta) | vac \rangle$$

wherein $|vac\rangle$ is all qubits in the zero state, H is a Hamiltonian, and an ancilla qubit controls activation of unitaries $U_j$ and $U_i$.

5. The system of claim 2, wherein $|\psi_i\rangle$ is a set of Slater determinants.

6. The system of claim 3, wherein the at least one of the computer executable components further:
optimizes parameters of the parameterized quantum circuit based on the expectation value of the qubit operator; and
selects a new trial state based on the optimized parameters of the parameterized quantum circuit.

7. A computer-implemented method, comprising:
encoding, by a system operatively coupled to a processor, a fermionic molecular Hamiltonian into a qubit operator; and
preparing, by the system, a multireference trial state based on the qubit operator, by applying a unitary circuit operator to a sum of selected initial configurations.

8. The computer-implemented method of claim 7, wherein the multireference trial state comprises:

$$|\Psi\rangle = U(\theta) \sum_i^{N_c} c_i |\psi_i\rangle.$$

wherein $c_i$ are complex amplitudes, $U(\theta)$ is a parameterized quantum circuit, $N_c$ is a number of selected initial configurations, and $|\psi_i\rangle$ are single determinant states.

9. The computer-implemented method of claim 8, further comprising:
computing, by the system, an expectation value of the qubit operator from the selected initial configurations.

10. The computer-implemented method of claim 9, wherein the expectation value is defined as:

$$E = \sum_i \sum_j c_i c_j^* \langle vac | U_j^\dagger(\theta) H U_i(\theta) | vac \rangle$$

wherein $|vac\rangle$ is all qubits in the zero state, H is a Hamiltonian, and an ancilla qubit controls activation of unitaries $U_j$ and $U_i$.

11. The computer-implemented method of claim 8, wherein $|\psi_i\rangle$ is a set of Slater determinants.

12. The computer-implemented method of claim 9, further comprising:
optimizing, by the system, parameters of the parameterized quantum circuit based on the expectation value of the qubit operator; and
selecting, by the system, a new trial state based on the optimized parameters of the parameterized quantum circuit.

13. A computer program product, the computer program product comprising one or more computer readable storage medium having program instructions embodied therewith, the program instructions executable by a processor to cause the processor to:
encode, by the processor, a fermionic molecular Hamiltonian into a qubit operator; and
prepare, by the processor, a multireference trial state based on the qubit operator, by applying a unitary circuit operator to a sum of selected initial configurations.

14. The computer program product of claim 13, wherein the multireference trial state comprises:

$$|\Psi\rangle = U(\theta) \sum_i^{N_c} c_i |\psi_i\rangle.$$

wherein $c_i$ are complex amplitudes, $U(\theta)$ is a parameterized quantum circuit, $N_c$ is a number of selected initial configurations, and $|\psi_i\rangle$ are single determinant states.

15. The computer program product of claim 14, the program instructions further executable by the processor to cause the processor to:
compute, by the processor, an expectation value of the qubit operator from the selected initial configurations.

16. The computer program product of claim 15, wherein the expectation value is defined as:

$$E = \sum_i \sum_j c_i c_j^* \langle vac | U_j^\dagger(\theta) H U_i(\theta) | vac \rangle$$

wherein |vac⟩ is all qubits in the zero state, H is a Hamiltonian, and an ancilla qubit controls activation of unitaries $U_j$ and $U_i$.

17. The computer program product of claim 14, wherein (b) is a set of Slater determinants.

18. The computer program product of claim 15, the program instructions further executable by the processor to cause the processor to:
   optimize, by the processor, parameters of the parameterized quantum circuit based on the expectation value of the qubit operator; and
   select, by the processor, a new trial state based on the optimized parameters of the parameterized quantum circuit.

19. The system of claim 2, wherein $N_c$ is greater than one.

20. The computer-implemented method of claim 8, wherein $N_c$ is greater than one.

* * * * *